Figure 1:
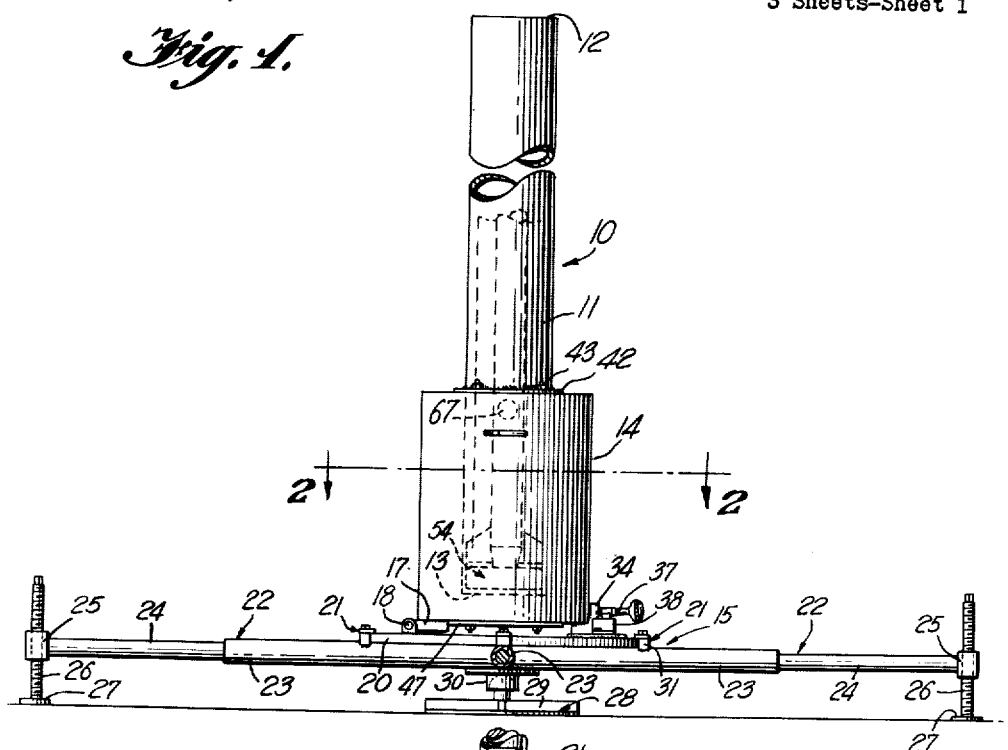

May 14, 1963

R. C. WEBSTER ETAL 3,089,388

ROCKET LAUNCHERS

Filed Nov. 27, 1959

3 Sheets-Sheet 1

INVENTORS
ROLAND C. WEBSTER
EDWARD SPECHLER
GERARD V. EMERSON

BY Martha L. Roos

AGENT

May 14, 1963

R. C. WEBSTER ETAL 3,089,388

ROCKET LAUNCHERS

Filed Nov. 27, 1959

3 Sheets-Sheet 2

INVENTORS
ROLAND C. WEBSTER
EDWARD SPECHLER
GERARD V. EMERSON

BY Martha L. Ross

AGENT

May 14, 1963  R. C. WEBSTER ETAL  3,089,388
ROCKET LAUNCHERS
Filed Nov. 27, 1959  3 Sheets-Sheet 3
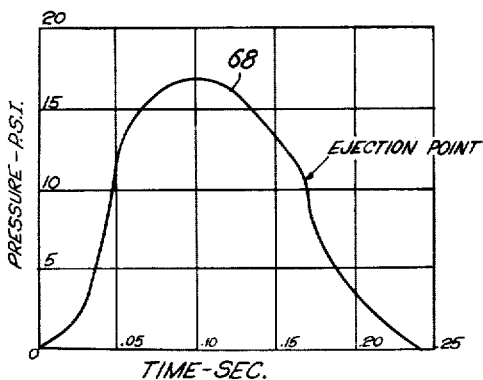
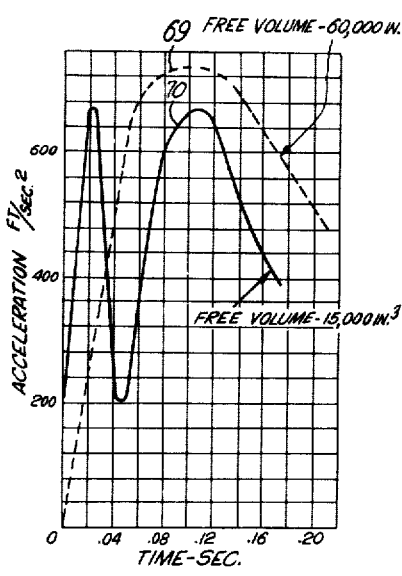
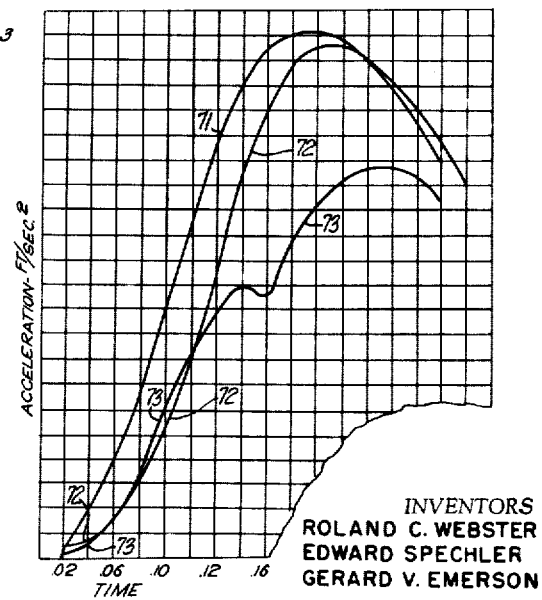
INVENTORS
ROLAND C. WEBSTER
EDWARD SPECHLER
GERARD V. EMERSON
BY Martha L. Roes
AGENT 3,089,388
ROCKET LAUNCHERS
Roland C. Webster, Springfield, Va., Edward Spechler, Washington, D.C., and Gerard V. Emerson, Arlington, Va., assignors to Atlantic Research Corporation, Fairfax County, Va., a corporation of Virginia
Filed Nov. 27, 1959, Ser. No. 855,845
12 Claims. (Cl. 89—1.7)

The present invention relates in general to rocket launchers, and more particularly to rocket launchers which include means for increasing the launching velocity of the rocket by providing a launching thrust in addition to the reaction thrust produced by the rocket motor.

Heretofore, the more common types of rocket launchers have been of the open breech variety which were of such construction that the exhaust gases produced by the rocket motor after ignition pass freely to the surrounding atmosphere. It it is desired to provide additional launching thrust for increasing the launching velocity and range of the rocket, the use of booster rockets has been usually resorted to.

Additionally, the use of closed breech rocket launchers has been proposed, particularly for use under conditions which prevent use of an open breech launcher, as in tank turrets and like installations. Such launchers usually involve a uniform diameter launcher tube wherein a rocket is initially positioned with its trailing end immediately adjacent the closed breech of the launcher tube. While the use of such closed breech launchers will inherently result in some entrapment of exhaust gases in the breech zone of the launcher tube which will provide a rapidly increasing pressure in this zone acting to expel the rocket from the launcher tube if the rocket walls lie closely adjacent the walls of the launcher tube, it has been recognized that such an arrangement is attended by decided disadvantages. For example, the exhaust gases trapped in the tube have been found to produce disturbing effects when the rocket leaves the muzzle of the launcher tube and the acceleration forces produced by the pressure rise of the trapped exhaust gases occur in impulses resulting in uneven acceleration. It has been found, for example, that there is a very short duration initial pressure rise and acceleration force immediately upon ignition of the rocket motor until the rocket is set into rapid motion up the launcher tube, and that this rapid initial motion of the rocket produces a rapid increase in the volume behind it resulting in a sharp reduction in pressure and acceleration force. For many applications, also, the initial acceleration produced by the combustion gas entrapped in the small breech volume is excessive.

An object of the present invention therefore is the provision of a novel rocket launcher having means for entrapping the rocket exhaust gases to impart a high launch velocity to the rocket in a manner maintaining substantially constant acceleration of the rocket as it proceeds through the launcher tube.

Another object of the present invention is the provision of a rocket launcher of the closed breech type having means for using the rocket exhaust gases to increase launching velocity and drive the rocket out of its launching tube with impulse-free acceleration.

Another object of the present invention is the provision of a rocket launcher having a relatively large volume chamber as compared to the volume of the launcher tube in communication with the breech zone of the launcher tube entrapping rocket exhaust gases produced upon ignition of the rocket and a piston associated with the trailing end of the rocket to separate therefrom when the rocket leaves the launcher, coacting to provide additional launching thrust from exhaust gas pressure and arranged in such a manner as to temper initial acceleration on the rocket to maintain even acceleration as the rocket proceeds through the launcher tube.

Another object of the present invention is the provision of a portable rocket launcher of the closed breech type which may be produced at low cost, which is readily portable and easily assembled and operated, which may be trained in azimuth and elevation through a selected vertical cone, and which is constructed to provide breechtype loading.

Other objects, advantages and capabilities of the present invention will become apparent from the following detailed description, taken in conjunction with the accompanying drawings, illustrating one preferred embodiment of the invention.

Figure 2:
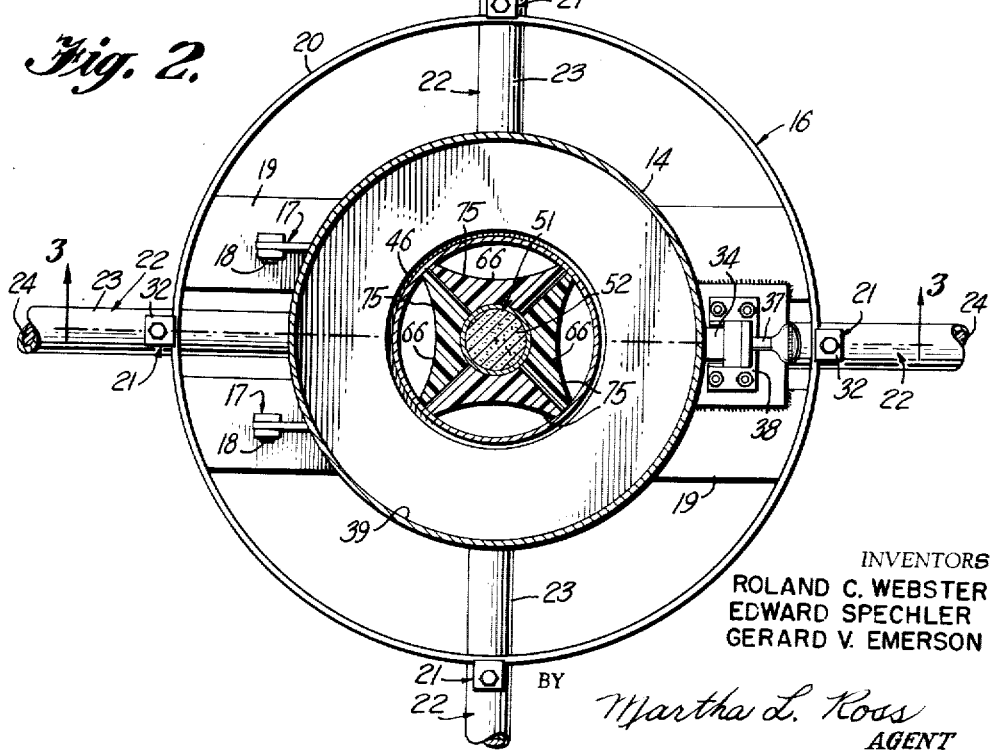
Figure 3:
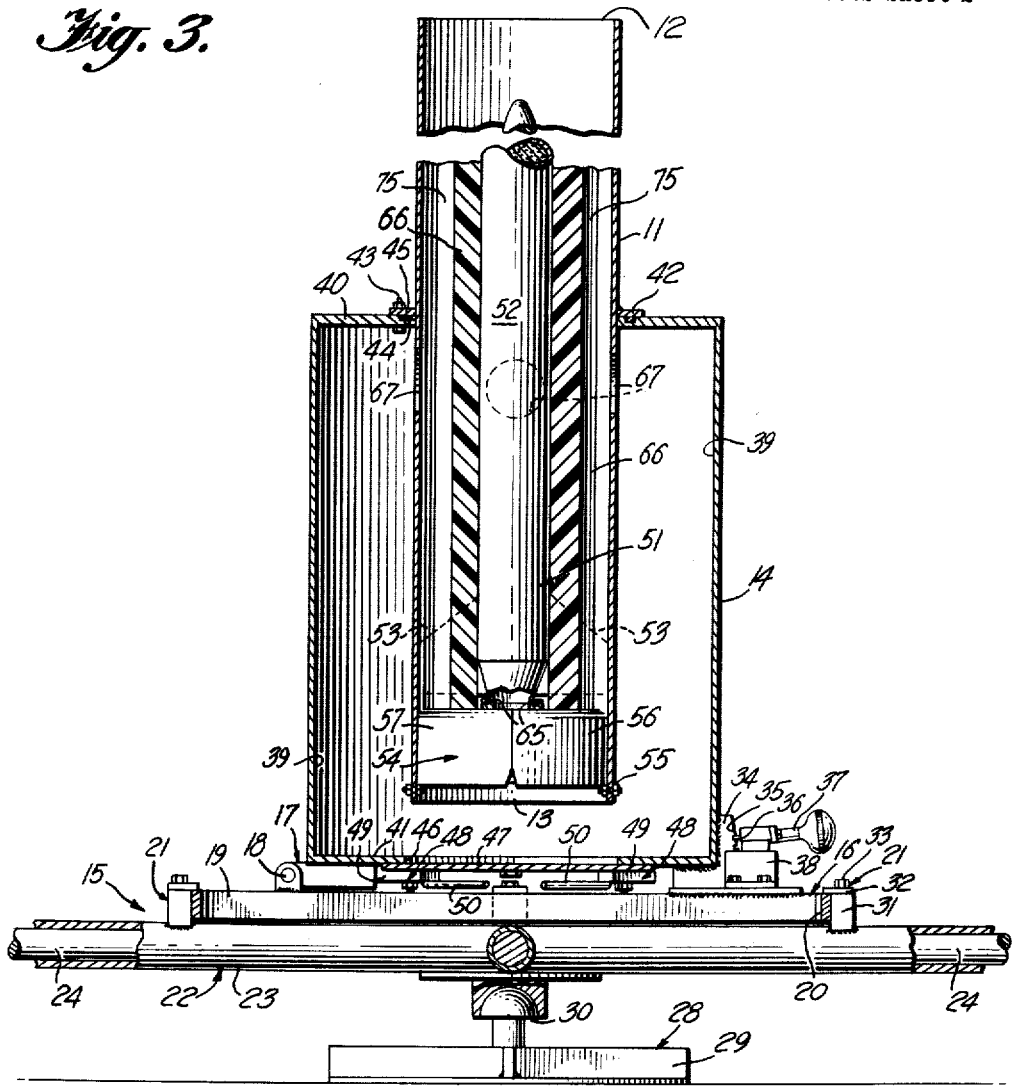
Figure 4:
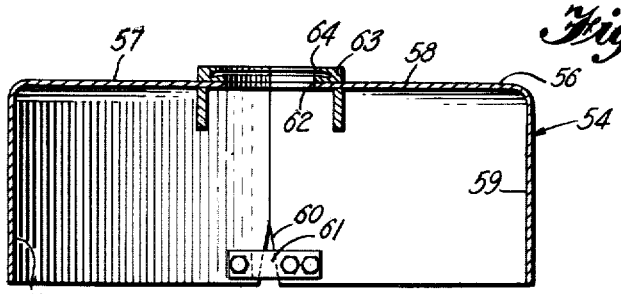

In the drawings:
FIGURE 1 is a side elevation of a rocket launcher embodying the present invention;
FIGURE 2 is a horizontal, transverse section view of the rocket launcher, taken along the line 2—2 of FIGURE 1;
FIGURE 3 is a vertical section view of the rocket launcher, taken along the line 3—3 of FIGURE 2;
FIGURE 4 is a vertical, transverse section view to enlarged scale of one preferred form of the separable piston employed in the rocket launcher;
FIGURE 5 is a graph illustrating the pressure vs. time relationship for a typical rocket launching in accordance with the present invention;
FIGURE 6 is a graph illustrating the acceleration vs. time relationship obtained with pressure modulating chambers of different capacities; and
FIGURE 7 is a graph illustrating the acceleration vs. time relationship obtained without by-passing vents communicating the pressure modulating chamber with outside air and with by-passing vents located on the launcher tube at different distances above the piston.

Referring to the drawings wherein like reference characters designate corresponding parts throughout the several figures, and particularly to FIGURES 1–3, the rocket launcher of the present invention, designated generally by the reference character 10, comprises an elongated launcher tube 11 of true circular cross-section having a muzzle end 12 and a breech end 13, a pressure modulating tube 12 extending in concentric relationship about the launcher tube, the launcher tube and chamber assembly being mounted for adjustment in azimuth and elevation on a launcher support assembly indicated by the reference character 15.

The launcher support assembly 15 is arranged to permit tilting of the launcher tube and pressure modulating chamber assembly to a horizontal position for breechtype loading and to provide elevation adjustment of as much as 10° from vertical and to permit training of the launcher by turning in azimuth. To this end, the base end of the pressure modulating chamber 14 is hinged to an azimuth and elevation table assembly 16 by means of a hinge assembly 17 having a pivot pin 18 to permit the launcher tube 11 and chamber 14 to be tilted about the axis of the pivot pin 18. The azimuth and elevation table assembly may assume the form illustrated in the drawings wherein a bridging panel 19 extends diametrically across an annular azimuth ring 20 which is supported for rotation about its center by azimuth lock units 21 mounted on each of four horizontal supporting legs 22 forming a cross-shaped support. The support legs 22 are preferably formed of an inner stationary tubular sleeve 23 and an extension arm 24 telescopically supported in the sleeve 23 to permit extension of the supporting legs to the desired length, the outer end of each extension arm having a threaded member 25 thereon to receive a threaded adjustment screw 26 having a bearing plate 27 at the lower end thereof, or a threaded stake which may be driven into the ground and rotated to effect leveling of the launcher support assembly 15. A pivot stand 28 is also carried by and depends from the center of the launcher support assembly and includes an enlarged bearing plate 29 and a pivot joint 30 such as a socket and head having a segmental surface of spherical curvature to permit tilting of the bearing plate 29 relative to the plane of the support legs 22.

The azimuth lock units 21 each comprise a guide block 31 welded to each of the support legs 22 at a proper distance from the junction of the four legs 22 so that the inner surfaces of each of the guide blocks 31 slidably abut the outer surface of the azimuth ring 20 and maintain the ring centered with respect to the juncture of the support legs 22, and a clamping plate 32 surmounting each of the guide blocks 31 and extending inwardly of the inner guide surface of the associated guide block 31 to bear against the top edge of the azimuth ring 20. A bolt 33 threaded into each of the guide blocks 31 and extending through the associated clamping plate 32 permits adjustment of the clamping plate 32 to frictionally lock the azimuth ring against rotation.

Welded or otherwise affixed to the lower corner of the pressure modulating chamber 14 at a point diametrically opposite the hinge assembly 17 is an elevation sector 34 having a toothed arcuate periphery 35 which is engaged by a lug 36 on the inner end of an axially reciprocal elevation lock member 37 supported in a bracket 38 mounted on the bridging panel 19 of the azimuth and elevation table 16. These components form an elevation index assembly, with the elevation lock member 37 resiliently biased or otherwise urged toward the elevation sector 34 to normally retain the lug 36 between a selected pair of the teeth on the toothed periphery 35 of the sector 34 and lock the launcher tube at the adjusted elevation setting.

The pressure modultaing chamber 14 is generally in the form of a closed cylindrical container having a continuous cylindrical outer wall 39 and annular top and bottom wall portions 40 and 41. The top of the annular top wall 40 of the pressure modulating chamber 14 forms the support for the launcher tube 11 and has a central aperture through which the launcher tube 11 projects. The launcher tube is provided with a rigid annular mounting flange 42 which is adapted to lap over the portions of the annular top wall 40 immediately bounding the central opening therein and be secured to the top wall 40 by bolt and nut units 43. The mounting flange 42 is suitably located lengthwise of the launcher tube 11 so as to dispose the breech end 13 of the launcher tube 11 a selected distance above the plane of the annular bottom wall 41 of the chamber 14. In order to provide an effective seal at the juncture of the mounting flange 42 and top wall 40, the top wall 40 may be provided with an annular groove 44 spaced slightly outwardly from the central opening in the top wall 40 and concentric with the axis of the top wall, in which is bonded an annular gasket 45 of neoprene or light flexible material to underlie and butt against the mounting flange 42.

The opening 46 in the bottom wall 41 of the chamber 14 which opening is preferably larger in diameter than the launcher tube 11, is normally closed by a circular cover plate 47 releasably held in place by conventional breech dogs 48 mounted on the lower surface of the annular bottom wall 41, the breech dogs 48 being of conventional construction including, for example, a pivoted clamping block 49 and operating handle 50.

The rocket, herein generally indicated by the reference character 51, which is of the conventional type having an elongated body 52 and guidance fins 53 is adapted to be loaded into the launcher tube 11 from the breach end 13 thereof and to be supported and launched on a separable piston assembly indicated generally by the reference character 54 which is in turn supported by retractable piston supports 55 supported in the wall of the launcher tube 11 adjacent the breech end 13 thereof.

The retractable piston supports 55 may be in the form of pins or threaded screws which are readily shiftable axially outwardly of the launcher tube 11 to retract them from the bore of the launcher tube to permit passage of the piston assembly 54 through the breech end 13 of the launcher tube 11 and then shifted inwardly of the launcher tube to project the inner ends of the retractable piston supports 55 beneath the piston assembly 54 and form supports therefor.

The piston assembly 54 should be of such a construction that the piston will readily separate from the rocket the instant the rocket leaves the launcher tube so as not to interfere with the action of the rocket fins 53. One satisfactory form of piston assembly is illustrated in the drawings, wherein the piston 54 is formed of two piston halves 56 and 57 which combine to form an annular transverse wall 58 corresponding substantially to the inner diameter of the launcher tube 11 and a rearwardly projecting peripheral flange 59. The flange portions 59 are provided with inclined cutouts forming V-shaped cuts 60 at the line of separation of the piston halves adjacent the edge of the flange and a hinge strap 61 rigidly connected to one of the piston halves and pivotally connected to the other piston half to form a hinge connection between the flanges of the piston halves at diametrically opposite points at the trailing edges thereof about which the piston halves can swing open. The transverse wall 58 formed by the piston halves 56, 57 is provided with a central opening 62 at least as large in diameter as the internal diameter of the rocket nozzle or exit opening, which is bounded by a split annular connecting ring 63 welded to the transverse wall portions 58 of the corresponding piston halves and having an inwardly and upwardly inclined annular groove 64 therein to receive an outwardly and rearwardly flaring annular lip formation 65 on the trailing end of the rocket body.

Since the guidance fins 53 project radially beyond the rocket body 52 in conventional rocket configurations, packing sections 66 are provided which fit between the fins of the rocket and extend a substantial distance along the rocket body, the packing sections 66 being configurated to abut the sides of the rocket body 52 and engage the inner surface of the launcher tube 11 at sufficient points to prevent the rocket from wobbling in the launcher tube prior to firing. One preferred embodiment is illustrated in the drawings wherein each of the packing sections 66 engage the inner surface of the launcher tube 11 at two circumferentially spaced points. The packing sections are preferably made a lightweight, heat insulating material, e.g., foamed plastics such as "Styrofoam" or foamed polyurethane, to minimize dead load and to protect the rocket wall from hot combustion gases which may be vented through the launching tube.

In order to accomplish the objects of this invention, the pressure modulating chamber 14 should provide a large initial volume into which the gases can expand. The pressure modulating chamber generally should have a volume equal to at least about 5 and preferably 10 times the volume increase produced by movement of the rocket one foot up the launcher tube. The function of the pressure modulating chamber 14 to accomplish the functions of tempering initial acceleration on the rocket, maintaining substantially constant acceleration on the rocket as it proceeds through the launching tube, and increasing initial velocity of the rocket, will be more clearly understood from consideration of the mathematical relationships describing pressurization of the launcher. The pressurization of the launcher can be described by the general gas law:

$$\frac{P(V_1 + \Delta V)}{T} = K$$

where.

K is a constant
P is the pressure (which is proportional to acceleration)
$V_I$ is the initial volume behind the rocket in which the rocket exhaust gases are accumulated
$\Delta V$ is the volume increase due to the rocket traveling up the launcher tube
T is the temperature Since the temperature remains relatively constant, this relationship can be stated, for all practical purposes to be $P(V_I + \Delta V) = K$.

From this relationship, it will be apparent that on ignition, the pressure (and the acceleration) will vary inversely with the initial volume $V_I$. Thus if the initial volume is very small, the pressure will be very high and there will be very high initial acceleration of the rocket. As the initial volume $V_I$ provided by the launcher becomes larger, the initial pressure and acceleration becomes smaller, since the product of these two factors must equal a constant.

To maintain maximum and relatively impulse free acceleration, it is necessary that the increase in volume, $\Delta V$, as the rocket travels up the launcher tube, be small relative to the initial volume $V_I$. The small $\Delta V$ factor relative to the large initial volume factor $V_I$, minimizes change in the pressure factor P and, thereby, acceleration. By providing a large initial volume behind the rocket in which the rocket's exhaust gases are accumulated, for example, in the form of the large volume pressure-modulating chamber 14 in communication with the breech of the launching tube 11, the desired conditions can be achieved.

In some cases, the acceleration produced with a pressure modulating chamber of given volume may be excessive. This can be controlled by means of vents 67 in the side of the launcher tube 11 located above the piston and in the portion lying within the pressure modulating chamber. The cross-sectional area of the vents and their distance above the piston can be varied to provide for the specific degree of gas venting desired in any given application. After ignition of the rocket propellant, a portion of the gases expanding into the pressure modulating chamber leak out of the vents from the chamber into the launching tube at a point above the piston, and then up the sides of the tube and out the muzzle end. Provision for passage of the vented gases up the launcher tube can be made in any suitable manner as, for example, by the vertical, lateral, concave recesses 75 in the foamed plastic packing sections 66. The venting passages are preferably separated from the rocket walls by the packing section, which thus functions to insulate the rocket casing from the hot venting combustion gases. The vents cease their gas-leaking function as soon as the piston moves above them during its passage up the launching tube. Positioning of the vents relative to the piston is, therefore, an effective means of controlling the duration of gas-venting and, thereby, the initial acceleration curve.

As an illustrative example, a launcher was designed for an upper-air sounding rocket weighing 78 pounds, wherein the rocket body was 78.5 inches long and 4.5 inches in diameter and had fins which completely spanned the diameter of the launcher tube; the launcher tube 11 had a total length of 120 inches and an inner diameter of 13.2 inches, with the flange 42 spaced 32 inches from the muzzle end 13 of the launcher tube 11. The pressure modulating chamber 14 in this embodiment had a height of 36 inches and an outer diameter of 27.5 inches. The peripheral flange 59 of the piston 54 was about 5 inches deep, and rested upon retractable piston supports 55 immediately adjacent the muzzle end 13 of the launcher tube 11. Such a construction provided an initial volume $V_I$ of slightly greater than 17,000 inches$^3$. In order to reduce the acceleration of "g's" produced with this particular embodiment to the desired level, four vent holes 67, each four inches in diameter, were provided in the wall of the launcher tube 11 spaced one inch above the piston 54 when the piston was supported on the retractable piston supports 55. The pressure-time curve 68 for an actual firing of a rocket with this particular example of the launcher is illustrated in FIGURE 5, wherein a maximum pressure of 16.8 p.s.i. and an average pressure of 11.9 p.s.i. were obtained. It will be noted that the ejection point of the rocket from the launcher tube 11 occurred at just over 0.17 second after ignition, the rocket having an exit velocity of 110 feet per second. With this arrangement, a maximum acceleration of 32.00 g's and an average acceleration of 23.74 g's were obtained. Since the rocket thrust of approximately 350 lb. delivers a take-off acceleration of approximately 4.5 g the launcher achieved a five-fold increase in average launch acceleration. It will be noted from the curve of FIGURE 5 that a substantially impulse-free pressure and acceleration was provided by the above construction as well as the very substantial additional thrust above that available from the reaction thrust of the rocket motor to assist launching of the rocket.

In the graph of FIGURE 6, the acceleration against time curves calculated for a different embodiment wherein the weight of the rocket was 350 pounds are shown for the time from ignition of the rocket motor to exit of the rocket from the launcher tube where an initial volume ($V_I$) of 60,000 inches$^3$ and an initial volume ($V_I$) of 15,000 inches$^3$ were provided. These curves, identified by the reference characters 69 and 70 respectively, were in connection with an entirely different rocket load from the covered by the curve of FIGURE 5 so that the volumes indicated in FIGURE 6 do not indicate the relationship which would obtain in the case of FIGURE 5. With the large initial volume of 60,000 inches$^3$, the curve 69 shows that a smooth acceleration occurs which continuously rises up to a peak at about .10 second after ignition and then gradually falls off, whereas with the initial volume of only 15,000 inches$^3$, the curve 70 shows that an initial acceleration peak of about 670 feet per second$^2$ occurs at about .02 second after ignition, followed by a rapid drop in acceleration to about 200 feet per second$^2$ at .05 second, and then another acceleration peak of about the same value as the initial peak occurs at about .11 second after ignition. The first peak of the curve 70 occurs when the rocket is set into rapid motion up the launcher tube, which produces a rapid increase in the volume behind it. Since the initial volume behind the rocket was not sufficient to give the smooth acceleration curve produced by the larger 60,000 cubic inch chamber, the very rapid increase in volume resulting from the motion of the rocket up the launcher tube results in the sharp, short deceleration shown by the curve 70.

By varying the size and location of the vent holes 67 or eliminating the vent holes, the maximum acceleration of g's and the slope of the acceleration against time curves can be altered to fit the specifications for a wide variety of rockets. This is demonstrated by the curves 71, 72 and 73 of FIGURE 7, all computed for a launcher system having an initial volume behind the rocket of 25,000 cubic inches for a rocket having a weight of 83 pounds and a start-up time of .023 second. Curve 71 illustrates the acceleration-time relation when no vent hole by-pass is provided. In such an arrangement, a maximum acceleration of 33 g's, an average acceleration of 22.2 g's and a maximum pressure of 33.3 p.s.i.a. are attained.

Curve 72 in FIGURE 7 illustrates the acceleration-time relationship for a launcher having vent holes providing a by-pass area of 50.2 square inches located five inches above the piston which closes at .12 second after ignition. With this arrangement, maximum acceleration of 32.2 g's, average acceleration of 19 g's and maximum pressure of 33 p.s.i.a. were obtained.

Curve 73 illustrates a launcher construction wherein vent holes providing a by-pass area of 50.2 square inches were located 25 inches above the piston and closed at .18 second after ignition. With this arrangement, maximum acceleration of 24.6 g's, average acceleration of 14.3 g's and maximum pressure of 27.8 p.s.i.a. were obtained. It will be noted from the curve 73 that a very short duration, shallow dip or deceleration occurs as the piston passes the vent holes and therefore closes the leakage path from the pressure modulation chamber.

To load the launcher, the operator withdraws the elevation lock member 37 to release the lug 36 from the teeth of the elevation section 34 and swings the launcher tube 11 and pressure modulating chamber 14 about the pivot pin 18 of the hinge assembly 17 to decline the axis of the launcher tube 11 to a substantially horizontal position. The breech dogs 48 are then actuated to release the cover plate 47 and the cover plate 47 is withdrawn from the breech opening 46, thereby exposing the rear end of the chamber 14 and launcher tube 11 for insertion of the rocket therein. The piston assembly 54 is then assembled onto the trailing end of the rocket by swinging the piston halves 56, 57 downwardly and outwardly about the hinge straps 61 and then reversing the relative movement of the piston halves to fit the groove 64 of the split connecting ring 63 about the lip 65 on the rocket body. The packing sections 66 are then fitted about the fins and adjacent body portions of the rocket and the assembled rocket, packing sections and piston assembly are then inserted through the breech opening 46 and breech end 13 of the launcher tube 11 while the retractable piston supports 55 are retracted from the bore of the launcher tube. The piston supports 55 are then projected into the bore of the launcher tube to form rests for the trailing edges of the peripheral flange 59 of the piston assembly 54. The cover plate 47 is then supported over the breech opening 46 and the breech dogs 48 shifted to cover plate locking position, and the launcher tube 11 and chamber 14 are swung upwardly to vertical position. The elevation lock member 37 is then actuated to fit the lug 36 between a set of the teeth of the elevation sector 35 appropriate for the particular elevation seating desired. The launcher tube 11 and chamber 14 may be trained in azimuth by loosening the bolts 33 and clamping plates 32 and rotating the azimuth ring 20 to the desired azimuth position, whereupon the bolts 33 may be tightened to lock the clamping plates 32 against the edge of the azimuth ring 20.

Upon ignition of the rocket fuel, for example by a conventional igniter and ignition leads operated from any suitable power source, the exhaust gases accumulate in the pressure modulating chamber 14 and begin to build up pressure on the piston assembly 54. The speed of pressure build-up is, of course, determined by the volume of the pressure modulating chamber 14, the position of the rocket exhaust nozzle relative to the breech end 13 of the launcher tube 11, and the existence, size, number and location of the vent holes 67. The pressure of the thus accumulated exhaust gases acting upon the piston assembly 54 attached to the trailing end of the rocket implements the reaction force of the rocket motor and drives the rocket out of the launcher tube with substantially impulse-free acceleration. The instant the rocket leaves the muzzle end 12 of the launcher tube, the piston halves 56 and 57 swing open about the hinge straps 61, releasing the split connecting ring 63 from the lip 65 on the rocket and allowing the piston to fall away to avoid interference with the action of the rocket fins as the rocket continues to accelerate. The foamed plastic packing sections 66, which serve to prevent the rocket from wobbling in the launcher tube, either disintegrate on launching or fall away from the rocket as it leaves the launcher tube.

By forming the support legs 22 as telescoping units and arranging the pivot pins 18 associated with the hinge assembly 17 removable, the rocket launcher can be readily disassembled into compact components of a convenient weight and be readily transported to desired locations in the field. Handles may be provided on the pressure modulating chamber 14 as illustrated in the drawings to facilitate such transportation of the disassembled components.

While but one preferred example of the present invention has been particularly shown and described, it is apparent that various modifications may be made therein within the spirit and scope of the invention, and it is desired, therefore, that only such limitations be placed on the invention as are imposed by the prior art and set forth in the appended claims.

What is claimed is:

1. A launcher for rockets and the like comprising an elongated launcher tube having muzzle and breech ends adapted to support a rocket prior to ignition adjacent the breech end thereof and guide the rocket during acceleration through the tube, means providing increased launching thrust for the rocket including piston means disposed in the launcher tube for free sliding movement therealong substantially sealing the launcher tube against passage of gases forwardly alongside the rocket and intercoupled with the rocket to impart launching movement thereto, and expansion chamber means surrounding, extending rearwardly of and communicating with the breech end portion of said launcher tube forming an enclosure for accumulating the exhaust gases produced upon ignition of the rocket to apply the pressure of the accumulated gases against said piston means and exert a launching force coacting with reaction thrust produced upon ignition of the rocket for driving the rocket out of the launching tube, said piston means having an opening therethrough to provide communication prior to ignition and throughout launch between said expansion chamber and the trailing end of the rocket, said expansion chamber means providing a gas accumulating volume of sufficient size so that a substantially even application of exhaust gas pressure against said piston means is provided to maintain substantially impulse-free acceleration of the rocket as it proceeds through the launcher tube.

2. A launcher for rockets and the like comprising an elongated launcher tube having muzzle and breech ends adapted to support a rocket prior to ignition adjacent the breech end thereof and guide the rocket during acceleration through the tube, means providing increased launching thrust for the rocket including piston means disposed in the launcher tube free of restraint by the launching tube for sliding movement therealong substantially sealing the launcher tube against passage of gases forwardly alongside the rocket and intercoupled with the rocket to impart launching movement thereto, and expansion chamber means surrounding, extending rearwardly of and communicating with the breech end portion of said launcher tube forming an enclosure for accumulating the exhaust gases produced upon ignition of the rocket to apply the pressure of the accumulated gases against said piston means and exert a launching force coacting with reaction thrust produced upon ignition of the rocket for driving the rocket out of the launching tube, said piston means having an opening therethrough to provide communication prior to ignition and throughout launch between said expansion chamber and the trailing end of the rocket, said expansion chamber means providing a gas accumulating volume at least 5 times as great as the volume in one foot of the launcher tube measured along the longitudinal axis.

3. A launcher for rocket-propelled devices comprising an elongated launcher tube having breech and muzzle ends, a closed expansion chamber surrounding, extending rearwardly of and disposed in concentric relation to the breech end and adjacent zone of the launcher tube, means adjacent the rocket device forming a gas pressure barrier across the launcher tube defining with said closed expansion chamber an enclosed space for accumulation of exhaust gases produced upon ignition of the rocket device, said gas pressure barrier having an opening therethrough to provide communication prior to ignition and throughout launch between said enclosed space and the trailing end of the rocket device, said gas pressure barrier being freely displaceable through said launcher tube in response to gas pressure in said enclosed space and having means forcing said rocket device therewith, said enclosed space having an initial volume when said rocket device and gas pressure barrier occupy a launch position adjacent the breech end of said tube of sufficient size relative to the volume of the launcher tube so that the pressure of the accumulated exhaust gases is free of substantial negative going excursions during travel of the rocket through the launching tube producing substantially impulse-free acceleration of the rocket device through the launcher tube.

4. A launcher for rocket-propelled devices comprising an elongated launcher tube having breech and muzzle ends, a closed expansion chamber surrounding, extending rearwardly of and disposed in concentric relation to the breech end and adjacent zone of the launcher tube, means adjacent the rocket device forming a gas pressure barrier across the launcher tube defining with said closed expansion chamber an enclosed space for accumulation of exhaust gases produced upon ignition of the rocket device, said gas pressure barrier having an opening therethrough to provide communication prior to ignition and throughout launch between said enclosed space and the trailing end of the rocket device, said gas pressure barrier being free of restraint by said launching tube and displaceable through said launcher tube in response to gas pressure in said enclosed space and having means forcing said rocket device therewith, said enclosed space having an initial volume when said rocket device and gas pressure barrier occupy a launch position adjacent the breech end of said tube of sufficient size relative to the increase of volume due to displacement of the rocket device and gas pressure barrier up the launcher tube during launching is small relative to the initial enclosed volume prior to launching to cause gas pressure to be exerted against said barrier producing substantially impulse free acceleration of the rocket device through the launching tube.

5. A launcher for rocket-propelled devices comprising an elongated launcher tube having open breech and muzzle ends adapted to support a rocket device prior to ignition adjacent the breech end thereof, a piston, extending transversely across said launcher tube and freely slidable axially therein, having an opening therethrough and adapted to be intercoupled with said rocket device to apply launching force to the rocket device in accordance with the movement of the piston, a closed chamber surrounding, extending rearwardly of, disposed in concentric relation to and in communication with the breech end and adjacent zone of the launcher tube providing an initial volume, communicating prior to ignition and throughout launch with the trailing end of the rocket device, of sufficient size relative to the volume of the launcher tube that the pressure of exhaust gases produced upon ignition of the rocket exerts substantially impulse-free pressure against said piston and rocket device for driving the same from the launcher tube.

6. A launcher for rocket-propelled devices comprising an elongated launcher tube having open breech and muzzle ends adapted to support a rocket device prior to ignition adjacent the breech end thereof, a piston, extending transversely across said launcher tube and freely slidable axially therein, having an opening therethrough and adapted to be intercoupled with said rocket device to apply launching force to the rocket device in accordance with the movement of the piston, a closed chamber surrounding, extending rearwardly of, disposed in concentric relation to and in communication with the breech end and adjacent zone of the launcher tube providing an initial volume, communicating prior to ignition and throughout launch with the trailing end of the rocket device, of sufficient size relative to the volume of the launcher tube that the incremental increase of volume produced during travel of the piston up the launcher tube during launching is small relative to the initial volume of said chamber and communicating launcher tube zone behind the piston prior to launching.

7. In a rocket launcher, the combination recited in claim 3, wherein said chamber has vent means for leaking a selected portion of the accumulated exhaust gas to a zone of said launcher tube between said barrier and said muzzle end for depressing the time rate of rise of pressure and rocket acceleration produced by said closed chamber.

8. In a rocket launcher, the combination recited in claim 5, wherein siad launcher tube includes a plurality of vent openings of selected cross section spaced selected distances toward said muzzle end from the initial position of said piston to provide selected leakage of pressure from said chamber to atmosphere, thereby reducing the rate of rise of accumulated gas pressure and rocket acceleration.

9. In a rocket launcher, the combination recited in claim 5, wherein said piston includes separable coupling means normally conditioned by engagement with the launcher tube wall to intercouple the piston and rocket device against relative displacement, said piston having means responsive to discharge of the piston from the launcher tube to release the piston from the rocket device.

10. In a rocket launcher, the combination recited in claim 6, wherein the volume of said closed chamber is at least about five times the volume increase per foot of piston travel in said launcher tube as the piston travels up the launcher tube.

11. A launcher for rockets of the type having a rocket motor nozzle at the trailing end thereof terminating in an outwardly flaring annular lip, said launcher comprising an elongated launcher tube having open breech and muzzle ends, a cup-shaped piston opening toward the breech end of said launcher tube adapted to be disposed between said breech end and the outwardly flaring lip of said nozzle, said piston including an annular disk-like wall disposed transversely of the axis of the launcher tube having an outer diameter conforming substantially to the inner diameter of the launcher tube and an inner diameter conforming substantially to the inner diameter of the exit end of said nozzle and an annular cylindrical flange wall projecting from said annular disk-like wall toward said breech end in free sliding relation with said launcher tube, releasable coupling means intercoupling said annular disk-like wall of said piston with said outwardly flaring rim of said nozzle for applying launching force to the rocket in accordance with movement of the piston axially through the launcher tube, a closed expansion chamber surrounding, disposed in concentric relation to and in communication with the breech end and adjacent zone of the launcher tube and further in communication prior to ignition and throughout launch with said rocket motor nozzle providing an initial volume when said piston and rocket occupy a launch position adjacent the breech end of the launcher tube of sufficient size relative to the increase of volume due to travel of the piston up the launcher tube during launching to provide substantially even exhaust gas pressure against said piston upon ignition of the rocket maintaining substantially impulse free acceleration of the rocket as it proceeds through the launcher tube.

12. A launcher for rockets and the like comprising an elongated launcher tube having muzzle and breech ends adapted to support a rocket prior to ignition adjacent the breech end thereof and guide the rocket during acceleration through the tube, means providing increased launching thrust for the rocket including piston means disposed in the launcher tube free of restraint by the launching tube for sliding movement therealong substantially sealing the launcher tube against passage of gases forwardly alongside the rocket and intercoupled with the rocket to impart launching movement thereto, and expansion chamber means surrounding, extending rearwardly of and communicating with the breech end portion of said launcher tube forming an enclosure for accumulating the exhaust gases produced upon ignition of the rocket to apply the ppressure of the accumulated gases against said piston means and exert a launching force coacting with reaction thrust produced upon ignition of the rocket for driving the rocket out of the launching tube, said piston means having an opening therethrough to provide communication prior to ignition and throughout launch between said expansion chamber and the trailing end of the rocket, said expansion chamber means having an internal transverse dimension substantially greater than the internal diameter of the launcher tube and providing a gas accumulating volume of sufficient size relative to the increase of volume due to displacement of the rocket and piston means up the launcher tube to produce substantially impulse-free acceleration of the rocket during launching.

References Cited in the file of this patent

UNITED STATES PATENTS

| | | |
|---|---|---|
| 1,480,957 | Schneider | Jan. 15, 1924 |
| 2,391,864 | Chandler | Jan. 1, 1946 |
| 2,773,450 | Donner | Dec. 11, 1956 |
| 2,801,416 | Evans et al. | Aug. 6, 1957 |
| 2,788,744 | Donner | Apr. 16, 1958 |
| 2,892,409 | Lyon | June 30, 1959 |
| 2,924,149 | Musser | Feb. 9, 1960 |

FOREIGN PATENTS

| | | |
|---|---|---|
| 502,560 | France | Feb. 24, 1920 |
| 300,428 | Italy | Sept. 8, 1932 |

OTHER REFERENCES

Ser. No. 273,401, Darche (A.P.C.), published June 1, 1943.

UNITED STATES PATENT OFFICE

CERTIFICATE OF CORRECTION

Patent No. 3,089,388                              May 14, 1963

Roland C. Webster et al.

It is hereby certified that error appears in the above numbered patent requiring correction and that the said Letters Patent should read as corrected below.

Column 9, line 35, strike out "is small"; line 36, strike out "relative to the initial enclosed volume prior to launching"; column 10, line 12, for "siad" read -- said --.

Signed and sealed this 31st day of December 1963.

(SEAL)
Attest:
ERNEST W. SWIDER                            EDWIN L. REYNOLDS

Attesting Officer                          Acting Commissioner of Patents